United States Patent
Valyi

[19]

[11] Patent Number: 6,077,578
[45] Date of Patent: Jun. 20, 2000

[54] MOLDED PLASTIC FOOD AND BEVERAGE CONTAINER AND METHOD

[75] Inventor: Emery I. Valyi, Katonah, N.Y.

[73] Assignee: The Elizabeth and Sandor Valyi Foundation, Inc., New York, N.Y.

[21] Appl. No.: 08/786,830

[22] Filed: Jan. 21, 1997

Related U.S. Application Data

[62] Division of application No. 08/495,049, Jun. 26, 1995, abandoned.

[51] Int. Cl.$^7$ ............................ B32B 27/08; B32B 27/30; B32B 27/36; B32B 33/00
[52] U.S. Cl. .................. 428/35.7; 215/12.2; 220/62.12; 220/62.13; 220/62.22; 428/36.7; 428/474.4; 428/475.2; 428/475.8; 428/476.1; 428/476.3; 428/483
[58] Field of Search ................................. 428/35.7, 36.7, 428/513, 475.2, 542.8, 475.5, 483, 36.6; 215/12.1, 12.2; 220/62.11, 62.12, 62.22

[56] References Cited

U.S. PATENT DOCUMENTS

| | | | |
|---|---|---|---|
| 3,804,663 | 4/1974 | Clark ........................................ | 427/542 |
| 4,741,936 | 5/1988 | Nohara et al. ........................... | 428/36.7 |
| 4,741,970 | 5/1988 | Fairchok et al. ......................... | 428/516 |
| 4,808,482 | 2/1989 | Benge et al. ........................... | 428/411.1 |
| 5,049,647 | 9/1991 | Al-Ghatta ................................. | 528/272 |
| 5,693,283 | 12/1997 | Fehn ......................................... | 264/513 |
| 5,759,653 | 6/1998 | Collette et al. ......................... | 428/35.9 |

OTHER PUBLICATIONS

"Barrier Polymers" in the Kirk Othmer Encyclopedia of Chemical Technology, Fourth Edition, John Wiley & Sons, vol. 3, pp. 931–962, 1992.

*Primary Examiner*—Ellis Robinson
*Assistant Examiner*—Sandra M. Nolan
*Attorney, Agent, or Firm*—Bachman & LaPointe, P.C.

[57] ABSTRACT

A multilayered container and a process for forming the same are disclosed. The container includes a support wall formed from a plastic having an undesirable substance therein and polymerized to a level less than that necessary to prevent the undesirable substance from migrating from the plastic into the contents when the contents are in contact with the support wall. A protective wall is provided adjacent the support wall and adapted to be positioned between the support wall and the contents. The protective wall is formed from a material which limits the migration of undesirable substance from the support wall into the contents.

5 Claims, 2 Drawing Sheets

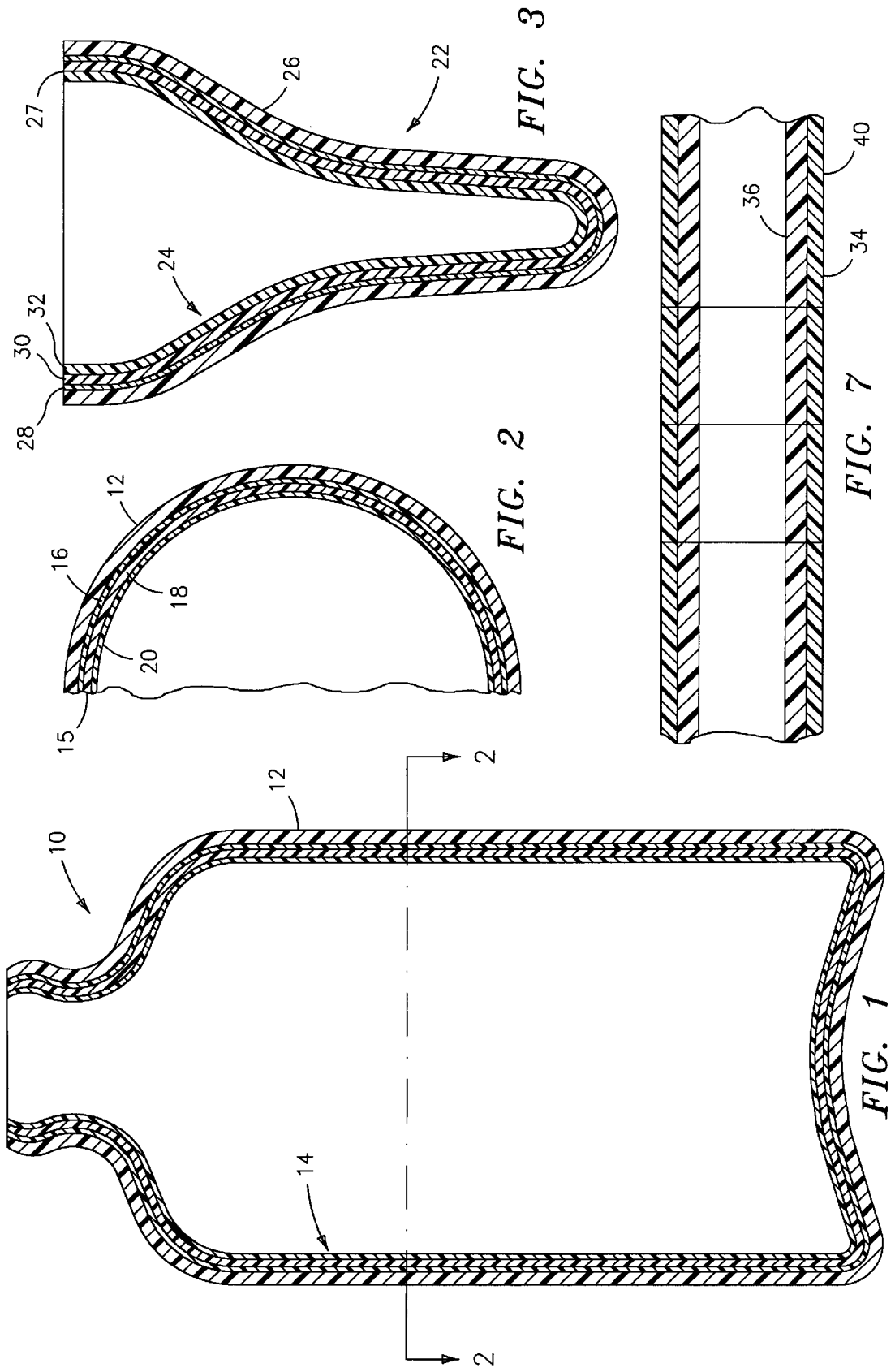

MOLDED PLASTIC FOOD AND BEVERAGE CONTAINER AND METHOD

This is a Division, of application Ser. No. 08/495,049, filed Jun. 26, 1995 now abandoned.

BACKGROUND OF THE INVENTION

The present invention relates to plastic containers adapted to contain food and beverages whose taste and/or odor may be affected by the materials of which the containers are made as well as by contaminants generated in the course of their manufacture and use of the containers. In particular, the invention relates to containers produced from polymers subject to degradation in the course of their conversion into containers, with the products of such degradation remaining entrapped within their walls and capable of diffusing into the contents, thereby affecting the taste and odor thereof.

Similarly, the polymers may contain oligomers i.e., molecular fractions that have insufficiently polymerized, as well as unreacted monomers, both of which may diffuse into the contents of the containers, with the same affect, as above. These conditions are encountered particularly in polymers obtained by condensation reactions, such as polycarbonate, nylon, and also polyethylene terephthalate (PET), the polymer predominantly used for beverage bottles and food jars.

To be suitable for use in food and beverage containers, PET must provide protection of the contents against deterioration such as, in the case of soft drinks, loss of carbonation or chemical reactions due to exposure to ambient conditions. Further, depending on their intended use, containers may be subject to considerable internal pressure and forces due to handling and storage. Therefore, the grades of PET to be used must be able to impart physical properties for withstanding these forces.

As is known, PET is a polymer that may be obtained in stepwise condensation of terephthalic acid and ethylene glycol. Polymerization is more complete the longer it is carried out at the appropriate temperature, and it may be repeatedly interrupted. Up to a certain stage of condensation, the reaction is carried out in the "molten" phase i.e., low-viscosity state, and is therefore termed a melt phase reaction, with the product designated as melt-phase PET. As this phase of the reaction progresses, the viscosity of the heated reacting mass increases to a degree, beyond which continuing manufacture is impractical. The polymer obtained at that stage, and even before, has many uses, notably for the production of textile fibers and film. However, melt-phase PET has insufficient physical properties and permeation resistance for use in large beverage bottles and certain other important packaging containers. Even more important, melt-phase PET entrains acetaldehyde (AA), a noxious product of thermal degradation, and also some oligomers, down to as yet unreacted monomer constituents, notably ethylene glycol. AA, which abbreviation stands for acetaldehyde, $CH_3CHO$, is a liquid of pungent-fruity odor that desorbs readily out of the walls of a container that is made from PET, in which the AA is entrained, into the contents to spoil the odor and taste thereof, even in very small concentrations. Thus, typical specifications for soft-drink bottles call for an AA limit of 1 ppm, and even less for drinking water. Likewise, unreacted monomers and oligomers may enter the content of the container and may, apart from interference with taste, constitute a health hazard as determined by prevailing laws regulating the same.

Accordingly, since AA is present in melt phase PET, the use of melt phase PET is not accepted for many forms of packaging, including some of the most important ones, i.e. beverage bottles. For the same reason melt-phase PET cannot be used even when its physical properties suffice, as in the case of small bottles that are subject to lesser stresses than large ones, since these stresses rise in proportion with size.

In order to obtain PET without the drawbacks associated with melt-phase PET, polymerization/condensation has to be continued. Since it is impractical to continue in the molten state, additional, expensive processes are added, wherein the melt-phase product is cooled, comminuted to a particle size suitable to be suspended and heated in and by a stream of hot air. The product is heated in a solid-state post-condensation reaction, preceded by crystallizing the melt-phase PET. Naturally, the cost of the finished PET increases substantially by these steps.

The cost of polymerizing the feedstock into the bottle-grade PET nearly doubles, compared with limiting the process to melt-phase polymerization. Particularly when the physical properties of containers made of melt-phase PET would otherwise suffice, as for small bottles, the increase in cost is accepted solely to eliminate excessive amounts of AA and other contaminants. In view of the fact that some 40% or more of the total manufacturing cost of a PET bottle is represented by the cost of the PET, it is readily seen that the use of melt-phase resin would represent great economic benefits.

There exists, therefore, a need for a container and process for manufacturing the container wherein melt-phase or scrap PET can be used in the container having unrestricted application to food and beverage by not contaminating the same.

SUMMARY OF THE INVENTION

The primary object of this invention is to provide a container and process which allows the use of PET that contains excessive amounts of AA and other contaminants in beverage and food containers.

Another object of this invention is to provide a plastic container from polymers that contain residues of their polymerization and/or other contaminants in excess of the amount acceptable for use of the container in packaging food and beverages.

It is a further object of the present invention to provide a simpler and more economical process for manufacturing PET and other analogous polymers for conversion into food and beverage containers for reducing manufacturing costs.

In accordance with the present invention, the foregoing objects and advantages may be readily obtained.

The container of the present invention includes a support wall formed from a plastic having an undesirable substance therein capable of migrating from said support wall. Preferably, the support wall is polymerized to a level less than that necessary to prevent the undesirable substance from migrating from the plastic into the contents when the contents are in contact with the support wall. In the preferred embodiment, the plastic is PET containing acetaldehyde in excess of 2 ppm. A protective wall is provided adjacent the support wall and adapted to be positioned between the support wall and the contents. The protective wall is formed from a material which limits the migration of undesirable substance from the support wall into the contents, to at least an acceptable level.

In one embodiment of the invention, the protective wall or barrier serves to avoid contamination due to acetaldehyde (AA) and substances that represent health hazards representing unintended, or unavoidable residues as a result of the manufacturing processes from which the PET is derived.

In a preferred embodiment, the PET is polymerized in the melt-phase or molten state only, without subsequent polymerization in the solid state, and the conversion thereof into containers is carried out in a manner that provides the physical properties necessary for their intended service, notably by sufficient bi-axial orientation.

A process for manufacturing the container of the present invention includes the steps of polymerizing a plastic containing an undesirable substance therein to a level less than that necessary to prevent the undesirable substance from migrating from the plastic into the contents when the contents are in contact with the plastic; combining the plastic with a protective substrate and forming a composite, wherein the protective substrate is formed from a material which limits the migration of the undesirable substance from the plastic into the contents, at least to an acceptable level; forming the composite into an article comprising at least one of a precursor and a preform; and blow molding the article into the container, wherein the protective substrate is positioned for contact with the contents. The precursor may be formed into a preform.

In the process, the step of combining may comprise the step of extruding the plastic onto the substrate for forming the composite. Alternatively, the step of combining may comprise the step of co-extruding the plastic with the substrate and forming the composite in one of the shape of a sheet and tube, or co-injecting the plastic with the substrate.

In a particular embodiment, the protective substrate is a laminate which may include an outer adhesive layer and which includes an intermediate layer of EVOH and an inner layer of PET having a low acetaldehyde content, wherein said inner layer is adapted to be formed to be positioned so as to contact the contents and shield the intermediate layer of EVOH from the contents.

In place of EVOH, other substances may be used for the same purpose, e.g. acrylonitrile polymers and nylons, depending on the types of contaminants to be excluded and the abundance thereof in the container walls. In practice, the composition of the barrier layer or laminate is calculated based on the laws of diffusion and the permeation properties and solubilities reported in the literature.

The above sheet or tube laminates may be economically produced in the plant which houses the melt-phase polymerization, preferably followed by producing preforms therefrom by conventional pressure forming and/or cutting operations, the same operations conventionally performed to render plastic convenient to distribute, in the shape of pellets.

The details of the present invention are set out in the following description and drawings wherein like reference characters depict like elements.

BRIEF DESCRIPTION OF THE DRAWINGS

The present invention will be more readily understandable from a consideration of the following drawings, wherein:

FIG. 1 is a cross-sectional view of a container of the present invention;

FIG. 2 is an enlarged, partial cross-sectional view taken along lines 2—2 of FIG. 1;

FIG. 3 is a cross-sectional view of a preform from which the container of FIG. 1 is molded;

FIG. 7 is a schematic representation of the manufacturing of a preform in accordance with FIG. 3, being made from the material manufactured according to the process of FIG. 5.

DETAILED DESCRIPTION OF THE PREFERRED EMBODIMENTS

Figure 4:
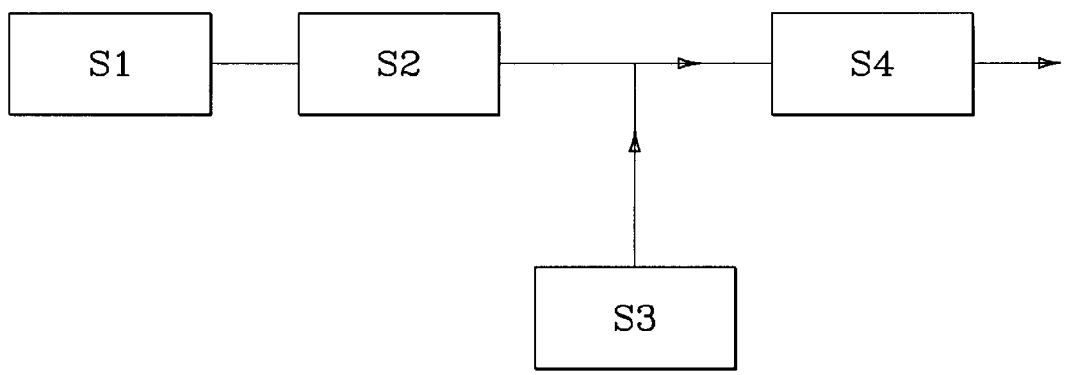
FIG. 4 is a schematic flow chart of the steps for manufacturing the material from which the container of FIG. 1 is to be made.

Referring now to the drawings in detail, there is shown in FIG. 1 a plastic container 10 for beverages or foods having an outer support wall 12 forming a structural layer designed to withstand the mechanical stresses imposed upon the container in the course of handling and use. Outer wall 12 is preferably made of PET, the mass of which entrains reaction products such as oligomers, unreacted monomers, and/or other compounds, for example, acetaldehyde (AA), and ethylene glycol. The reaction products are present in sufficient quantity to reduce the average molecular weight of the mass substantially below that required for performance of the container.

In polymerizing, the material of which outer wall 12 consists, such as in a production condensation reaction, the aforementioned reaction products remain absorbed in the mass upon cooling from the reaction temperature. Upon renewed heating, which may be necessary for producing wall 12, as by molding into preforms for containers, the several above mentioned reaction products thereof as well as other undesirable substances can become mobile due to reduced viscosity and gas formation, and therefore, are able to move through the wall or other mass in accordance with the solubility and pressure gradients that develop due to heating. A similar problem exists when employing scrap with breakdown products therein which represent undesirable substances capable of migrating from the support wall. Accordingly, the aforementioned substances can tend to migrate out of wall 12 or other mass by diffusion or desorption and into contents enclosed by wall 12 when wall 12 is in immediate contact therewith. Due to contamination effects, this result is undesirable. These phenomena are extensively reported in published literature.

An important example of this phenomena in the design of containers is seen by the production of polyethylene terephthalate, hereinafter PET, which is extensively used for beverage and food packaging and is the preferred plastic for use in forming container 10. PET used for carbonated beverage containers should have an average molecular weight corresponding to an intrinsic viscosity (IV) in the range of 0.7–1.2, depending on the intended services, such as, for example, for use in direct contact with food and beverages. Polymerized to the degree necessary to obtain this viscosity, PET contains less of the above mentioned undesirable substances than would interfere with its use in forming beverage or food containers or bottles and accordingly a wall similar to wall 12 but subject to this process would substantially not exhibit the migratory reaction products discussed above. This is one of the main reasons for extending the condensation reaction in spite of the substantial incremental cost. Another reason is to obtain the mechanical properties required of certain containers.

However, a great number of containers do not require the mechanical properties of further polymerized PET. For example, carbonated beverage bottles of small diameter, such as 10–20 oz. bottles, do not require the same strength material as larger containers. Accordingly, PET having an IV equal to 0.70 and below could be used, were it not for the effect of undesirable substances or reaction products such as AA on taste, that desorb from the PET container wall into the beverage or food or other unreacted monomers and unlinked monomers or oligomers which may diffuse into food from the container in amounts not permitted by health regulations.

In many instances, unlike the process disclosed herein for the production of container 10, an expensive process of polymerization is used for the purpose of avoiding the above undesirable substances.

According to FIGS. 1 and 2, use of PET polymerized to a lesser degree, as having an IV ranging between 0.55 and 0.65 deciliters per gram, is made possible by lining the container 10 or wall 12 with an inner protective wall 14 that is able to minimize, or altogether eliminate, the entry of taste and odor-affecting substances such as AA into the contents of the container.

Inner wall 14 preferably contains or is a material that is impervious to undesirable substances, as AA and/or other unreacted monomers and/or oligomers discussed above by way of example. A particularly effective and preferable barrier material is EVOH which is substantially impervious to AA, although it loses its efficacy when in contact with water. Similarly, other suitable inner-wall materials fail to retain their desired properties when exposed to the characteristics of the contents of the container. Further, some of these materials may not be used in contact with the contents, since they may also undergo changes in contact therewith. Also, some of the materials available and functional for the intended purposes of being impervious to AA do not readily adhere to the outer wall 12, which can result in unsightly and non-functional containers. An additional layer is therefore preferably used.

Accordingly, and as shown in FIG. 2, inner wall 14 is preferably made of a laminate 15 composed of several layers, each having a function. For example, in the case of an outer wall made of PET, there may be a tie-layer of an adhesive 16 adjoining outer wall 12, preferably followed by a barrier layer of EVOH 18, and then by one of a layer of a polyolefin as polypropylene (PP) and a preferably thin layer of solid state PET 20 having a low acetaldehyde content, as the means to protect the EVOH layer from water contained in the beverage or food, all shown in exaggerated thickness for simplicity. Additional examples of barrier layer material are Selar Nylon (DuPont), MDX6 Nylon (Mitsubishi Chemicals), acrylonitrate polymers, polyethylene naphthalate (PEN), and polyolefin containing materials. The manufacture of such laminated structures, as by co-extrusion, is well known and widely practiced.

Accordingly, a process for manufacturing container 10 includes blow molding a preform 22, shown in FIG. 3, whereby preform 22 exhibits an inner layer or wall 24 and an outer layer 26, corresponding to the outer and inner walls 12 and 14, respectively, of container 10 of FIG. 1. Inner wall 24 is preferably a laminate 27 having layers 28, 30 and 32 corresponding to laminate 15 and layers 16, 18 and 20 discussed above. It follows that preform 22 is the primary article to be made from PET that contains the contaminants referred to.

Several processes for the production of lined preforms are known, including one according to U.S. Pat. No. 4,149,645, and they are usable for the purposes of this invention. However, they are unsuited to take full advantage of the cost savings available, based on the process of the present invention, using a grade of PET that is preferably polymerized to a lesser degree and with a higher AA content than the grades normally used which are subjected to additional polymerization have low AA.

Figure 6:
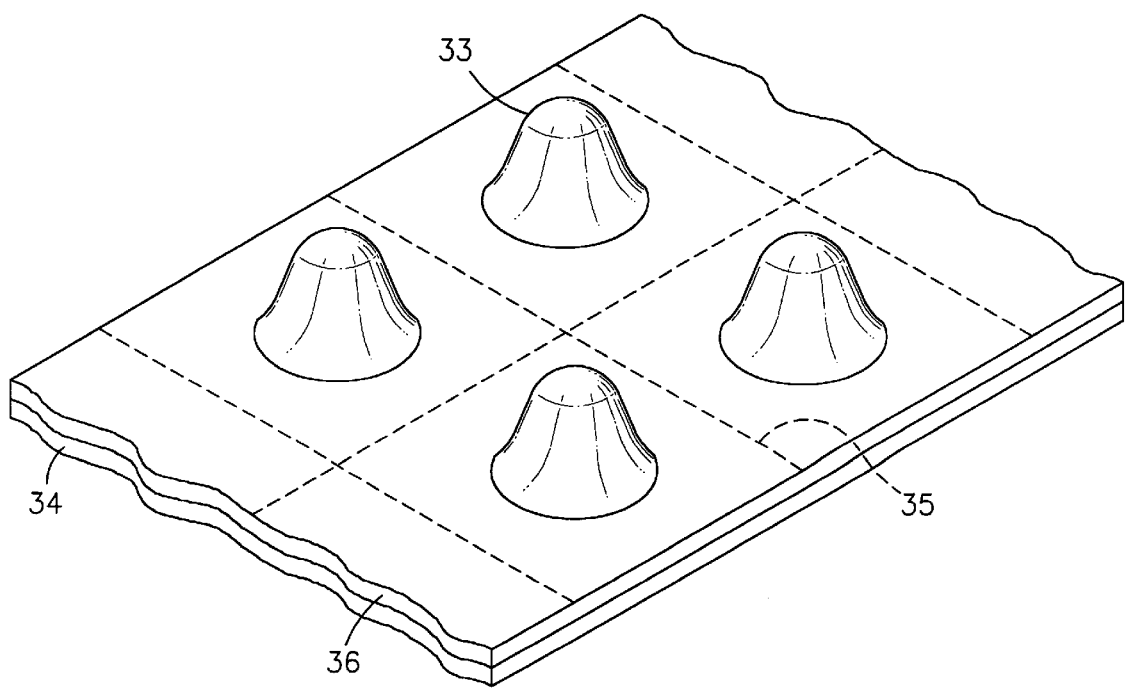
FIG. 6 is a schematic representation of the manufacturing of a preform in accordance with FIG. 3, being made from the material manufactured according to the process of FIG. 4.

FIG. 4 illustrates schematically the process of producing at least a precursor 33 of preform 22. Accordingly, and referring also to FIGS. 1–3, PET is preferably polymerized to within the IV range of 0.55 to 0.65 in station S1 and transferred to an extruder in station S2. The transfer from station S1 to station S2 may be effected without allowing the PET to cool below the extrusion temperature, or enter the cooled and comminuted state. Preferably, the PET is extruded uncrystallized as a sheet 34, adapted to form wall 12, onto a substrate 36, as shown in FIG. 6, adapted to form laminates 15 and 27. Referring to FIGS. 4 and 6, substrate 36 is preferably produced by co-extrusion in station S3 and joined to PET sheet or wall 12 from station S2, a composite is then made thereby and entered into a pressure forming unit in station S4, equipped to produce preforms 22, or precursors thereof. The last named operation at station S4 is known and practiced, usually under the designation of "coupled thermoforming". The result of that operation is shown in FIG. 6, in which several precursors 33 have been molded from the substrate or laminate 36 and PET sheet 34, which are shown prior to being separated from the sheet by trimming. After trimming, a skeleton scrap remains which may be recycled with or without separating its layers.

The reference to precursor 33 of preform 22 is made because the above process of thermoforming does not always conveniently produce all the necessary features of the finished preform. For example, the necks of many preforms must be threaded, which would render thermoforming impractical. In such case, the precursor is preferably made by thermoforming, meaning an article of equal weight and close dimensions to preform 22 is made, designed so as to subsequently fit into a mold to provide the final features such as, for example, dimensions and threads. These features may be achieved by a corrective operation such as, for example, compression molding, in accordance with well known practices.

The precursors may be separated from sheet 36 in such a manner that there is substantially no scrap produced, as by trim cuts along lines 35 as to provide a square top in a precursor instead of a round top.

Figure 5:
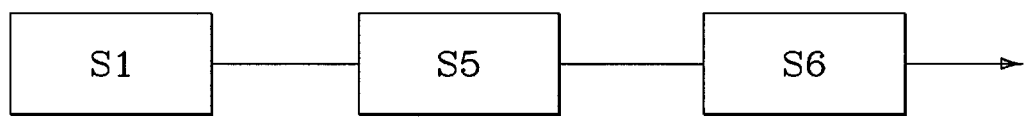
FIG. 5 is a schematic flow chart of alternate steps for manufacturing the material.

An alternate method for forming the preform 22 and container 10 is shown schematically in FIG. 5. The PET product of polymerization, i.e. sheet 34 obtained in station S1 and laminate or substrate 36, similar to as shown in FIG. 6, is transferred into an extruder at station S5 equipped to produce co-extruded tubes 40, as shown in FIG. 7. The practice of co-extrusion is well known, and in the present case, the tube consists of an outer layer comprising sheet 34 of the melt-phase PET or other polymer, corresponding to outer wall 12 of container 10 or outer layer 26 of preform 22, and an inner layer comprising laminate or substrate 36, as described above and corresponding to laminate 15 of inner wall 14 of container 10 or laminate 27 of preform 22, emerging as tube 40 from station S5 and directed into station S6. In station S6, tube 40 is preferably subdivided into tube segments, as indicated by the dotted lines of FIG. 7, forming precursors made up of the tube segments.

As a further alternative method (not illustrated) for introducing a barrier resin within the body of or adjacent to the PET layer or wall 12, wherein the barrier resin is preferably similar to those used with reference to the discussion of the embodiments of FIGS. 4 and 5, a co-injected preform can be formed according to known practice or in accordance with the process discussed in the above cited U.S. Pat. No. 4,149,645. The barrier resin can be co-injected in a mold along with the structural PET layer, having the undesirable substances, so that the barrier resin forms the innermost layer of the preform and inhibits the release of the aforementioned undesirable substances into the contents of the container.

For all of the embodiments described above, it may happen that the material best suited to serve as a barrier, such as to the loss of carbonation, is also a suitable barrier to exclude AA, or vice versa, as in the preferred embodiment with EVOH, and also with PEN and nylons. In such cases, and as with container 10, the substrate in the form of laminate 15 comprising inner wall 14 performs the double service of retaining one substance within the container while excluding another undesirable substance.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A container comprising:

a support wall of a melt phase polymerized biaxially oriented polyethylene terephthalate sheet retaining therein undesirable substances intrinsic to its polymerization, wherein said substances include unreacted monomers, oligomers, and 2 ppm or more of acetaldehyde, wherein residual amounts of said undesirable substances therein are capable of migrating from said polyethylene terephthalate into the container's contents when said contents are in contact therewith, wherein said polyethylene terephthalate has an intrinsic viscosity of less than 0.70 deciliters per gram;

a protective wall adjacent said sheet to limit the migration of said undesirable substances from said support wall into said contents, said protective wall comprising a polymeric barrier and an inner polyolefin layer, with said protective wall being positioned between said support wall and said contents and said inner layer being positioned to contact said contents;

wherein said container is blow molded from a preform made from said sheet and said protective wall.

2. The container according to claim 1, wherein said intrinsic viscosity ranges from 0.55 to 0.65.

3. The container according to claim 1, wherein said support wall is formed from PET not subjected to polymerization in the solid state.

4. The container according to claim 1, wherein said undesirable substance includes ethylene glycol.

5. The container according to claim 1, wherein said undesirable substance is at least one of a monomer from which said plastic of said support wall is polymerized and an oligomer produced during polymerization of said plastic of said support wall.

* * * * *